United States Patent [19]

Gibbens

[11] 3,875,961

[45] Apr. 8, 1975

[54] MULTI-WAY VALVE

[75] Inventor: Roy P. Gibbens, Asheville, N.C.

[73] Assignee: Sybron Corporation, Rochester, N.Y.

[22] Filed: July 12, 1973

[21] Appl. No.: 378,791

[52] U.S. Cl. ...... 137/223; 128/2.05 G; 137/614.11; 137/614.19
[51] Int. Cl. ........................ F16k 15/20; A61b 5/02
[58] Field of Search ........ 128/2.05 6; 137/223, 596, 137/614.11, 614.19, 230

[56] References Cited
UNITED STATES PATENTS

| | | | |
|---|---|---|---|
| 216,545 | 6/1879 | Westinghouse | 137/596 |
| 566,811 | 9/1896 | Schindel | 137/223 |
| 2,717,100 | 9/1955 | Engelder | 137/596 X |
| 2,828,050 | 3/1958 | Engelder | 137/596 X |
| 3,482,564 | 12/1969 | Robinson | 128/2.05 G |
| 3,603,487 | 9/1971 | Cook | 222/389 |
| R23,370 | 5/1951 | Grant | 137/596 |

*Primary Examiner*—Alan Cohan
*Assistant Examiner*—Gerald A. Michalsky
*Attorney, Agent, or Firm*—Theodore B. Roessel; James A. Rich

[57] ABSTRACT

A pneumatic air valve core serves as a check valve during inflation of articles such as sphygmomanometer cuffs and as a flow control valve when the pressure is released. The core is mounted in a valve housing, which is connected by screw threads to an inlet housing. An adjusting screw is mounted in a threaded bore extending through the inlet housing, and the screw contacts the stem of the valve core. The adjusting screw depresses the stem of the valve core and holds the valve core open when the housings are screwed closer together, but allows the core to function as a check valve when the housing are screwed farther apart. A vent hole extends through one of the housings and communicates with the valve core. A control sleeve, attached to one of the housings, lets air flow through the vent hole when the housings are screwed closer together, but shuts off the flow through the vent when the housings are screwed farther apart. Thus, when the housings are screwed apart air supplied to the inlet housing passes through the valve core to the article being inflated. The valve core serves as a check valve until the housing are screwed closer together, at which time the pressure is relieved through the valve core and vent hole.

4 Claims, 6 Drawing Figures

MULTI-WAY VALVE

BACKGROUND OF THE INVENTION

This invention relates to a valve, and more particularly to a multi-way valve for inflating and releasing pressure from articles such as sphygmomanometer cuffs.

In the simplest and most common form of sphygmomanometers, the cuff is inflated by squeezing a hand bulb. Check valves are used to keep air from leaking out during inflation and to hold pressure in the cuff after inflation. In some cases, the check valves are built right into the bulb. In others, simple check valves, such as the air valve cores commonly used in pneumatic tires, have been built into the line leading to the cuff.

In addition to check valves, some means must be provided for releasing pressure from the cuff at a slow, controlled rate. Generally, a small needle valve is connected to the line from the bulb to the cuff (usually as part of a fixture that connects the bulb to the line). Since these valves are used by the diagnostician to control the rate at which pressure is released, they must be produced with some care. Thus, they add a significant amount to the cost of the sphygmomanometer.

SUMMARY OF THE INVENTION

It is an object of this invention to provide a multi-way valve for inflating and releasing pressure from articles such as sphygmomanometer cuffs.

Another object is to provide a less expensive system for inflating and releasing pressure from a sphygmomanometer cuff.

A further object is to provide a multi-way valve in which an air valve core of the type used in pneumatic tires is used as a check valve during inflation and as a flow control valve while pressure is being released.

According to the invention, the air valve core is installed in a valve housing, which is connected by screw threads to an inlet housing. An adjusting screw is mounted in a threaded bore through the inlet housing and contacts the stem of the valve core. Thus, when the inlet housing and the valve housing are screwed closer together, the adjusting screw depresses the stem and holds the valve core open. When the inlet housing and the valve housing are screwed farther apart, the adjusting screw allows the air valve core to close and function as a check valve.

A vent hole extends through one of the housings and communicates with the inlet to the valve core. A control sleeve, which is attached to one of the housings, lets air flow through the vent hole when the housings are screwed closer together, and shuts off flow through the vent hole when the housings are screwed farther apart. Thus, when the housings are screwed farther apart, air supplied to the bore through the inlet housing, e.g., by a hand bulb, passes through the valve core, which now functions as a check valve, and inflates the cuff. However, when the housings are screwed closer together, both the valve core and the vent hole are opened, and air is released from the cuff at a rate controlled by the degree of opening of the valve core.

Since the valve core functions as a check valve during inflation and as a flow control valve during pressure release, there is no need for a separate needle valve. Thus, the cost of the unit is reduced.

Other objects and advantages of this invention will be apparent from the following description.

DRAWINGS

DETAILED DESCRIPTION

Figure 1:
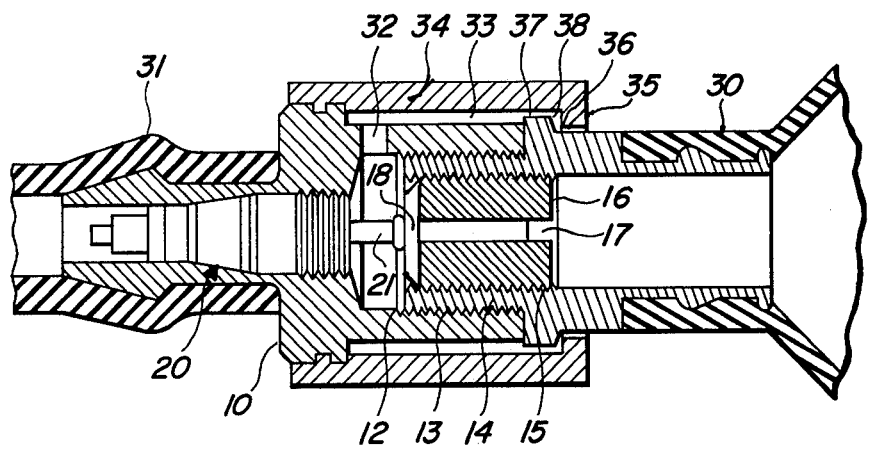
FIG. 1 is a cross-sectional view of one embodiment of this invention.

Referring to FIG. 1, an air valve core 20 is mounted in a stepped bore that extends through a valve housing 10. The largest portion 12 of the stepped bore, located at the inlet end of the valve housing, is internally threaded, and an inlet housing 14 is screwed into this threaded portion 12. An adjusting screw 16 is mounted in a partially threaded bore 15 that extends through the inlet housing 14, and the adjusting screw contacts the stem 21 of the valve core.

Figure 2:
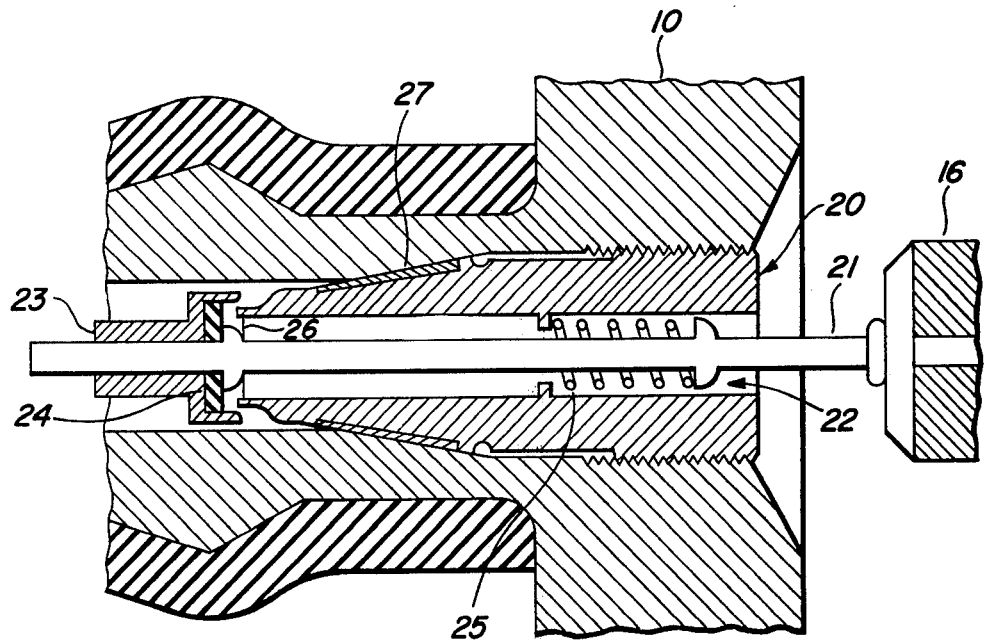
FIG. 2 is an enlarged cross-sectional view of the air valve core shown in FIG. 1.
Figure 3:
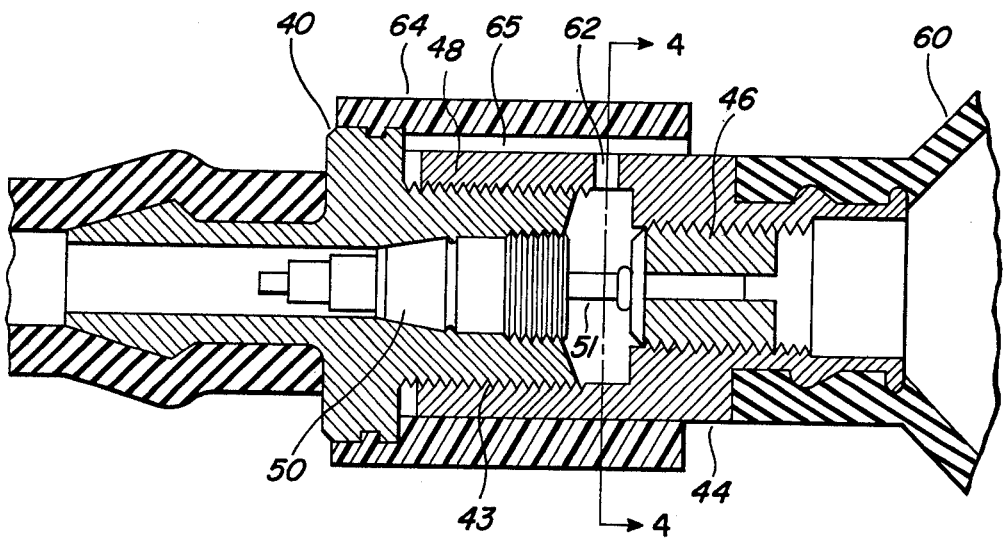
FIG. 3 is a cross-sectional view of another embodiment of this invention.
Figure 4:
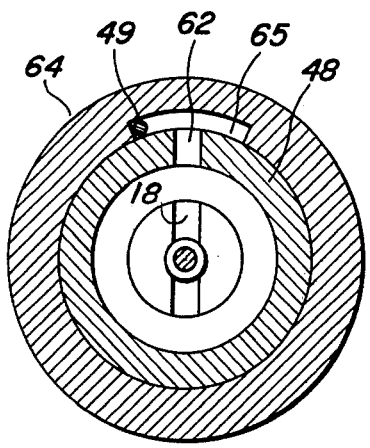
FIG. 4 is a cross-sectional view taken along lines 4—4 of FIG. 3.

As may be seen in FIG. 2, the stem 21 extends through a flow passage 22 extending through the valve core. A valve member 23 having a gasket 24 mounted therein is attached to the stem and a coil spring 25 urges the valve member against the outlet 26 from the flow passage 22 through the valve core. Thus, when the stem is not being depressed by the adjusting screw 16, the valve core functions as a check valve, permitting flow from right to left but not vice versa. A conical sealing gasket 27 prevents air from leaking past the valve core.

Referring again to FIG. 1, a hand bulb 30 is attached to the inlet housing 14; and a rubber tube 31, attached to the valve housing 10, leads to the cuff or other article being inflated. During inflation the valve housing 10 and inlet housing 14 are screwed far enough apart so that the adjusting screw 16 allows the valve core 20 to close and function as a check valve. The air supplied by the hand bulb 30 during inflation passes through a hole 17 through the adjusting screw 16, through the valve core 20, and through the tube 31 to the cuff. A slot 18 across the end of adjusting screw 16 that contacts the stem 21 allows the air to flow smoothly past the stem.

Pressure is released from the cuff by screwing the valve housing 10 and the inlet housing 14 closer together, whereby the adjusting screw 16 depresses the stem 21 of the valve core and holds the core open. The rate at which pressure is released is controlled by the distance between the gasket 24 of valve member 23 and the outlet 26 from the flow passage through the valve core. This distance in turn depends upon the amount of rotation of the housings with respect to each other, and upon the pitch of the threads connecting the housings. With most commonly available pneumatic tire valve cores, and with screw threads having a pitch of 64 threads to the inch, rotating one of the housings by about one-eighth to one-fourth of a turn (45° to 90°) will release the pressure in the cuff at a satisfactory rate.

The air released from the cuff is discharged through a vent hole 32 that extends through the valve housing 10 and communicates with the inlet to the passage through the valve core 20. Flow of air through the vent hole 32 is controlled by a sleeve 34, attached to the valve housing 10, which extends past an outwardly projecting shoulder 37 on the valve housing 14. The control sleeve 34 and valve housing 10 define an annular passage 33 that extends from the vent hole 32 past this shoulder 37.

The projecting shoulder 37 has a conical surface 38 which faces away from the valve housing, i.e., it is located on the side of shoulder 38 that is farthest away from the valve housing. The conical surface 38 is coaxial with the screw threads 13 that connect the two housings together. The control sleeve 34 has an inwardly projecting shoulder 35, and this shoulder has an annular edge 36 which is also coaxial with the screw threads connecting the two housings. This edge 36 contacts conical surface 38 when the two housings are screwed farther apart and moves away from the conical surface when the two housings are screwed closer together. The conical surface 38 provides a line contact seal with the annular edge 36 of shoulder 35, which promotes proper sealing. However, in some cases other configurations, such as a pair of flat surfaces, may be preferred for various reasons such as ease of manufacture.

FIG. 1 shows the valve in the "open" or venting position, i.e., with the valve housing and inlet housing screwed close enough together to move the annular edge 36 away from the conical surface 38. In this position, the control sleeve lets the air being vented from the cuff escape through the vent hole 32. However, when the two housings are screwed apart and the annular edge 36 contacts the conical surface 38, flow through the vent hole 32 is shut off and the air supplied by the hand bulb 30 must pass through the valve core 20 and inflate the cuff. The adjusting screw 16 is set so that it just misses the stem 21 of the valve core when the annular edge 36 contacts the conical surface 38. From this position, screwing the two housings one-eighth to one-fourth turn closer together will provide enough of a gap between the conical surface 38 and the annular edge 36 to allow air to escape through the vent hole; and, as was mentioned above, will depress the stem 21 of the valve core and allow air to escape from the cuff at the desired rate. Thus, the valve can be switched back and forth from the "open" or venting position, in which air is blown down from the cuff, to the "closed" or inflating position, in which air supplied by the hand bulb must pass through the valve core and the valve core serves as a check valve, with just an eighth to a quarter turn of either of the housings. As may be seen, the valve core 20 serves as a check valve during inflation and controls the flow rate during pressure release. Thus, there is no need for a separate needle valve to release pressure from the cuff and the cost of the unit is reduced significantly.

FIGS. 3–6 illustrate a second embodiment of this invention. As in FIG. 1, an air valve core 50 is mounted in a valve housing 40, which is connected by screw threads 43 to an inlet housing 44 containing an adjusting screw 46 that bears on the stem 51 of the valve core. However, since a different control sleeve arrangement is used in this embodiment, the valve housing 40 screws into the inlet housing 44, instead of vice versa as was the case in the valve illustrated in FIG. 1.

The control sleeve 64 of this second embodiment comprises a hollow cylinder having an axially extending groove 65 on its inner surface. A cylindrical portion 48 of the inlet housing 44, having a diameter substantially equal to the inner diameter of the control sleeve 64, fits within the control sleeve, which is attached to the valve housing 40. Both the control sleeve 64 and the cylindrical portion 48 of the inlet housing are coaxial with the screw threads 43 that connect the housings together. Thus, screwing the housings closer together or farther apart rotates the control sleeve with respect to the cylindrical portion 48 of the inlet housing.

Figure 5:
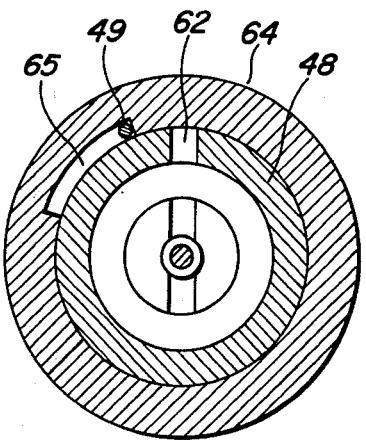
FIG. 5 is a cross-sectional view taken along the same plane as FIG. 4, but with the control sleeve rotated to the "closed" position.

A vent hole 62, which communicates with the inlet end of the valve core 50, extends through this cylindrical portion 48 of the inlet housing. As may be seen in FIGS. 4 and 5, rotating the control sleeve with respect to the inlet housing aligns the vent hole 62 with the groove 65 in the control sleeve 64 (FIG. 4) or moves the vent hole 62 and groove 65 out of alignment (FIG. 5). In the "open" or venting position illustrated in FIG. 4, the groove forms an aperture that lets air from the cuff escape through the vent hole 62. In the "closed" position illustrated in FIG. 5, the vent hole is covered; and air supplied by the hand bulb 60 passes through the valve core 50 to the cuff.

Figure 6:
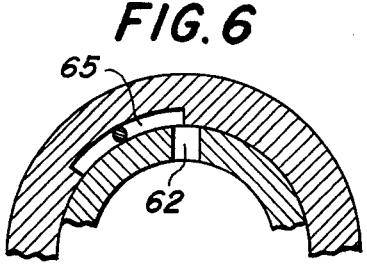
FIG. 6 is a fragmentary cross-sectional view along the same plane as FIGS. 4 and 5, with the control sleeve rotated to throttle flow through the vent hole and provide supplementary flow control.

The control sleeve 64 of this embodiment may also be used to supplement the flow control provided by the valve core 50. This is accomplished by rotating the control sleeve, as shown in FIG. 6, so that the edge of groove 65 partially covers the vent hole 62. In this position, the sleeve throttles the flow through the vent hole. If desired, an elongated slot may be used instead of a round vent hole to facilitate use of this supplementary flow control.

The adjusting screw 46 is set so that it just misses the stem 51 of the valve core when the valve is in the "closed" position illustrated in FIG. 5. Thus, this valve, like the one illustrated in FIG. 1, can be switched from the "open" position to the "closed" position with just an eighth to a quarter turn of the housings with respect to each other. As may be seen in FIGS. 4 and 5, a stop 49 projects from the cylindrical portion 48 of the inlet housing. This stop and the groove 65 in the control sleeve limit the rotational movement of the housings with respect to each other to the desired range, which in the illustrated embodiment is approximately one-eighth turn.

The valve core used in either of the illustrated embodiments should be capable of providing a positive seal throughout the range of pressures, typically 20 to 300 millimeters of mercury or about 0.5 to 6 psi, to which sphygmomanometer cuffs are inflated. At the same time, the valve spring should be as light as it can be, consistent with the need for a positive seal, in order to minimize the amount of work needed to operate the hand bulb and inflat the cuff. One commercially available pneumatic tire valve core that has been found to satisfy these requirements is Schrader's model 1566T. However, a number of other valve cores could be used in its place.

A variety of other modifications will also be apparent to those skilled in the art. For example, in a sphygmomanometer, it is believed desirable to mount the control sleeve on the valve housing so that the valve may be operated by rotating the hand bulb and the control sleeve with respect to each other. However, in other applications it might be preferable to mount the control sleeve on the inlet housing. It should be understood that the embodiments described above are merely illustrative and that these and other modifications may be made to these embodiments within the scope of this invention, which is defined by the following claims.

I claim:

1. A valve for inflating and releasing pressure from the cuff of a sphygmomanometer comprising:
    a valve housing containing an air valve core having:
        an inlet, an outlet and a flow passage extending through the core from said inlet to said outlet,
        a valve member covering said outlet,
        biasing means urging the valve member against said outlet, and
        a valve stem attached to the valve member and extending through the passage;
    an inlet housing connected to said valve housing by screw threads;
    a threaded bore extending through said inlet housing and communicating with the inlet to the passage through the valve core;
    means for supplying air to said threaded bore and means for connecting the outlet from the passage through the valve core to a sphygmomanometer cuff;
    an adjusting screw mounted in said threaded bore and contacting the valve steam, whereby screwing the valve housing and the inlet housing closer together depresses the valve stem and moves the valve member away from the outlet from the passage through the valve core;
    a vent hole extending through one of said housings and communicating with the inlet to the passage through the valve core;
    a control sleeve attached to one of said housings and extending past an outwardly projecting shoulder on the other housing, said sleeve and one of said housings defining a vent passage extending from said vent hole past said outwardly projecting shoulder; and
    an inwardly projecting shoulder on said control sleeve, said inwardly projecting shoulder being adapted to contact said outwardly projecting shoulder and shut off flow through said vent hole and said vent passage when the housing are screwed farther apart, whereby air supplied to the bore through the inlet housing passes through the valve core to the cuff, and to move away from said outwardly projecting shoulder when the housings are screwed closer together to depress the valve stem of the core, whereby air flows at a controlled rate from the cuff through the valve core, the vent hole and the vent passage.

2. A valve according to claim 1 wherein the outwardly projecting shoulder has a conical surface facing away from said first housing, and an annular edge of the inwardly projecting shoulder contacts said conical surface.

3. A valve according to claim 2 wherein said conical surface and said annular edge are coaxial with the screw threads that connect the housings together.

4. A multi-way valve for supplying fluid to and releasing fluid from an article comprising:
    a valve housing containing a valve core having:
        an inlet, an outlet and a flow passage extending through the core from said inlet to said outlet,
        a valve member covering said outlet,
        biasing means urging the valve member against said outlet, and
        a valve stem attached to the valve member and extending through the passage;
    an inlet housing connected to the valve housing by screw threads;
    a threaded bore extending through said inlet housing and communicating with the inlet to the passage through the valve core;
    means for supplying fluid to said threaded bore and means for connecting the outlet from the passage through the valve core to said article;
    an adjusting screw mounted in said threaded bore and contacting the valve stem, whereby screwing the valve housing and the inlet housing closer together depresses the valve stem and opens the valve core;
    a vent hole extending through one of the housings and communicating with the inlet to the passage through the valve core;
    a control sleeve attached to a first one of said housings and extending past an outwardly projecting shoulder on the other housing, whereby the control sleeve and one of the housings define a vent passage extending from said vent hole past said outwardly projecting shoulder;
    a conical surface on the outwardly projecting shoulder, said surface being coaxial with the screw threads that fasten the housings together and facing away from said first housing; and
    an inwardly projecting shoulder on the control sleeve, said inwardly projecting shoulder having an annular edge adapted to contact said conical surface and shut off flow through the vent hole when the two housings are screwed farther apart, whereby fluid supplied to said threaded bore passes through said valve core to said article, and to move away from said conical surface when said housing are screwed closer together to depress the valve stem, whereby fluid flows at a controlled rate through said valve core, said vent hole and said vent passage.

* * * * *